US010549613B2

(12) United States Patent
Yoshizawa et al.

(10) Patent No.: US 10,549,613 B2
(45) Date of Patent: Feb. 4, 2020

(54) PANEL RETENTION STRUCTURE

(71) Applicant: AISIN SEIKI KABUSHIKI KAISHA, Kariya-shi, Aichi-ken (JP)

(72) Inventors: Kazuhiko Yoshizawa, Kariya (JP); Takashi Kitani, Nagoya (JP); Shinji Sakai, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 16/107,235

(22) Filed: Aug. 21, 2018

(65) Prior Publication Data

US 2019/0061828 A1    Feb. 28, 2019

(30) Foreign Application Priority Data

Aug. 22, 2017   (JP) ................................. 2017-159437
Jan. 22, 2018   (JP) ................................. 2018-008297

(51) Int. Cl.
*B60J 7/043*      (2006.01)
*B62D 25/06*    (2006.01)
*B62D 65/02*    (2006.01)

(52) U.S. Cl.
CPC ............... *B60J 7/043* (2013.01); *B62D 25/06* (2013.01); *B62D 65/02* (2013.01)

(58) Field of Classification Search
CPC .......... B62D 25/06; B62D 62/02; B60J 7/043; F16B 2/20; F16B 5/0657; F16B 5/0664; F16B 21/02
See application file for complete search history.

(56) References Cited

U.S. PATENT DOCUMENTS

| 9,938,997 | B2 | 4/2018 | Iwahara et al. |
| 2015/0322985 | A1* | 11/2015 | Scroggie ............... F16B 19/008 29/428 |
| 2016/0368433 | A1* | 12/2016 | Vega Velazquez ......................... B60R 13/0206 |
| 2017/0182949 | A1* | 6/2017 | Kato ......................... B60R 7/02 |
| 2019/0016277 | A1* | 1/2019 | Dallos, Jr. ............... B60R 13/04 |
| 2019/0162215 | A1* | 5/2019 | Santillan Gutierrez .. F16B 2/22 |

FOREIGN PATENT DOCUMENTS

| JP | 2007-203862 | 8/2007 |
| JP | 2013-047531 | 3/2013 |
| JP | 2013-169803 | 9/2013 |
| JP | 2014-149018 | 8/2014 |

* cited by examiner

*Primary Examiner* — Jason S Morrow
(74) *Attorney, Agent, or Firm* — Finnegan, Henderson, Farabow, Garrett & Dunner, LLP

(57) ABSTRACT

A panel retention structure includes a retention member including a head portion, a neck portion and a flange portion being provided in the aforementioned order from an end of the retention member. The neck portion includes a dimension which is set smaller than a dimension of a first hole and a dimension of a second hole, and passes through the first hole and the second hole. The head portion is in contact with a confronting surface serving as a surface of a retention wall facing a panel body in one of a state where the head portion is elastically in contact with the panel body, and a state where an elastic wall being elastically in contact with an opposing surface serving as a surface of the retention wall which opposes the panel body is provided.

5 Claims, 5 Drawing Sheets

PANEL RETENTION STRUCTURE

CROSS REFERENCE TO RELATED APPLICATIONS

This application is based on and claims priority under 35 U.S.C. § 119 to Japanese Patent Applications 2017-159437 filed on Aug. 22, 2017 and 2018-008297 filed on Jan. 22, 2018, the entire content of which is incorporated herein by reference.

TECHNICAL FIELD

This disclosure generally relates to a panel retention structure.

BACKGROUND DISCUSSION

Various kinds of known panel retention structures are provided (for example, JP2007-203862A (hereinafter referred to as Patent reference 1)). The panel retention structure disclosed in Patent reference 1 includes a resin-made roof panel forming a design surface, and a metal-made base panel supporting the roof panel. The roof panel and the base panel are joined with each other by glue made of, for example, urethane resin, which is disposed therebetween.

Here, the joint of the roof panel and the base panel by glue may cause a problem in which the roof panel is separated from the base panel in a case where the glue is removed by, for example, adhesive failure or the effect of vibration when a vehicle runs at high speed.

Now, the roof panel is retained relative to the base panel with the use of a retention member (clip) in addition to glue. FIG. 9 shows a cross sectional view illustrating an example of the retention structure of the retention member. As illustrated in FIG. 9, the resin-made roof panel 90 includes a panel body 91 forming the design surface and a retention portion 92 protruding downwardly relative to the panel body 91. The retention portion 92 includes a retention wall 92a extending along the panel body 91. The retention wall 92a includes a first hole 92b opening in a vehicle height direction.

Meanwhile, the metal-made base panel 95 includes a second hole 95a facing the first hole 92b and opening in the vehicle height direction below the retention portion 92. The second hole 95a opens larger than the first hole 92b so as to include the whole first hole 92b therewithin.

The retention member 97 includes a neck portion 97a being inserted into the first and second holes 92b, 95a. The retention member 97 includes a first head portion 97b and a second head portion 97c. The first head portion 97b is connected to an upper end of the neck portion 97a provided in the first hole 92b and is in contact with a circumferential rim portion of the first hole 92b. The second hole 95c is connected to a lower end of the neck portion 97a provided in the second hole 92a and is in contact with a circumferential rim portion of the second hole 95a. The retention member 97 retains the roof panel 90 relative to the base panel 95 by sandwiching the retention wall 92a and the base panel 95 between the first and second head portions 97b, 97c.

Meanwhile, the retention member 97 sandwiches the retention wall 92a and the base panel 95 between the first and second head portions 97b, 97c to fix the roof panel 90 and the base panel 95 in the vehicle height direction. Thus, because the joint position joined by glue is unchanged, the retention member 97 may draw in the retention portion 92, and the panel body 91 may be deformed in a case where the roof panel 90 is thermally deformed in accordance with the change in temperature.

A need thus exists for a panel retention structure which is not susceptible to the drawback mentioned above.

SUMMARY

According to an aspect of this disclosure, a panel retention structure includes a roof panel being made of resin, the roof panel including a panel body forming a design surface and a retention portion protruding downwardly relative to the panel body, the retention portion including a retention wall extending along the panel body, the retention wall being formed with a first hole opening in a vehicle height direction, a base panel being made of metal, the base panel being joined to the roof panel with an adhesive agent, the base panel being formed with a second hole opening in the vehicle height direction and facing the first hole, the base panel supporting the roof panel, and a retention member including a head portion, a neck portion and a flange portion being provided in the aforementioned order from an end of the retention member. The neck portion includes a dimension which is set smaller than a dimension of the first hole and a dimension of the second hole, and passes through the first hole and the second hole. The head portion is in contact with a confronting surface serving as the surface of the retention wall facing the panel body in one of a state where the head portion is elastically in contact with the panel body, and a state where an elastic wall being elastically in contact with an opposing surface serving as a surface of the retention wall which opposes the panel body is provided. The flange portion includes a dimension which is set larger than the dimension of the first hole and the dimension of the second hole, the flange portion being disposed to include a clearance relative to the base panel in the vehicle height direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A first embodiment of a retention structure of a panel will hereunder be explained with reference to the drawings. Hereinafter, a front-rear direction of a vehicle is referred to as a front-rear direction.

Figure 1:
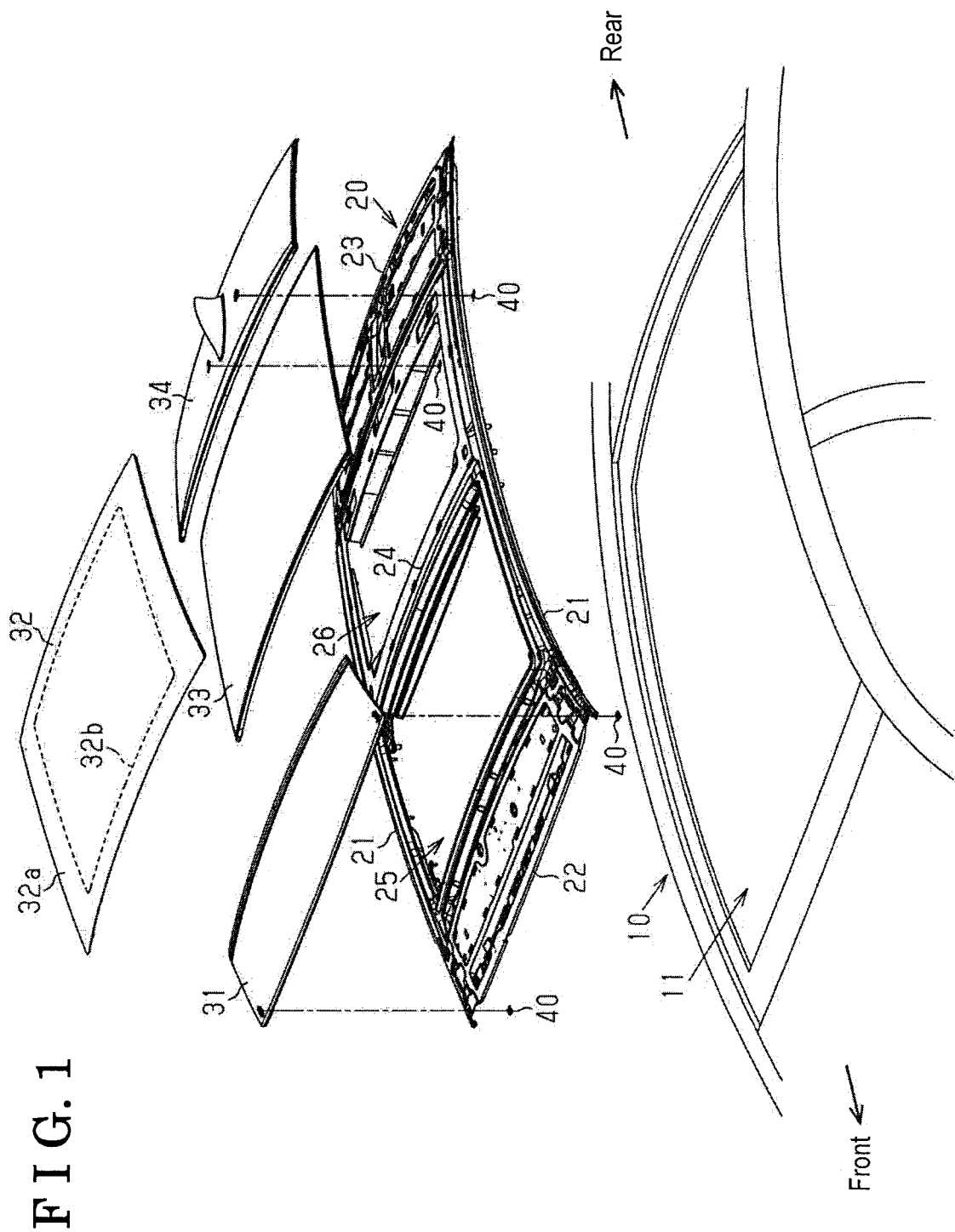
FIG. 1 is an exploded perspective view of a construction of a retention structure of a panel according to a first embodiment disclosed here.

As illustrated in FIG. 1, a roof 10 of a vehicle of, for example, an automobile includes a roof opening 11 that is formed in a substantially quadrilateral shape and that extends in the front-rear direction. The roof 10 is provided with a base panel 20 that is made of iron (metal) and that is mounted on a circumferential rim portion of the roof opening 11.

The base panel 20 includes a pair of side frames 21, a front frame 22, a rear frame 23 extending along side rim portions in a vehicle width direction, a front rim portion, and a rear rim portion of the roof opening 11, respectively. The base panel 20 further includes a middle frame 24 connecting middle portions of the side frames 21 in the front-rear direction in the vehicle width direction. The base panel 20 is formed such that the side frames 21, the front frame 22, the rear frame 23, and the middle-frame 24 are joined or integrated with one another by, for example, welding. That is, the base panel 20 includes a front opening 25 and a rear opening 26 that are formed such that the base panel 20 is divided into two in the front-rear direction by the middle frame 24. The base panel 20 is mounted on and fixed on a circumferential rim portion of the roof opening 11 at the side frames 21, the front frame 22 and the rear frame 23.

A front roof panel 31 (i.e., serving as a roof panel), a movable panel 32, a fixed panel 33, and a rear roof panel 34 serving as a roof panel are disposed adjacent to one other in the front-rear direction on the base panel 20. The front roof panel 31, the movable panel 32, the fixed panel 33, and the rear roof panel 34 form a design surface.

The front roof panel 31 is made from a resin material and is formed in a quadrilateral shape to match the front frame 22 so as to cover thereabove. The front roof panel 31 is mounted and joined to the front frame 22 by glue made from, for example, urethane resin.

The movable panel 32 includes a panel portion 32a, and an inner panel 32b. The panel portion 32a is made of glass and is molded in a substantially quadrilateral shape to match a circumferential rim portion of the front opening 25 so as to open and close the front opening. The inner panel 32b is made of iron (metal), is formed in a substantially quadrilateral shape, and is joined to a circumferential rim portion of the panel portion 32a by glue made from, for example, urethane resin. The movable panel 32 is configured such that the front opening 25 is openable and closable by joining to a sunroof unit appropriately provided so as be open and closed at the inner panel 32b.

The fixing panel 33 is made from a glass material and is formed in a substantially quadrilateral shape so as to match a circumferential rim portion of the rear opening 26 so as to cover thereabove, and is mounted on and joined to the circumferential rim portion of the rear opening 26 by glue made from, for example, urethane resin.

The rear roof panel 34 is made from a resin material and formed in a substantially quadrilateral shape so as to match a circumferential rim portion of the rear frame 23 so as to cover thereabove, and is mounted on and joined to the rear frame 23 by glue made from, for example, urethane resin.

End portions of the front roof panel 31 in the vehicle width direction are attached with a pair of retention members 40. Similarly, center portions of the rear roof panel 34 in the vehicle width direction are attached with the pair of the retention members 40 that are disposed adjacent to each other in the vehicle width direction.

Figure 2:
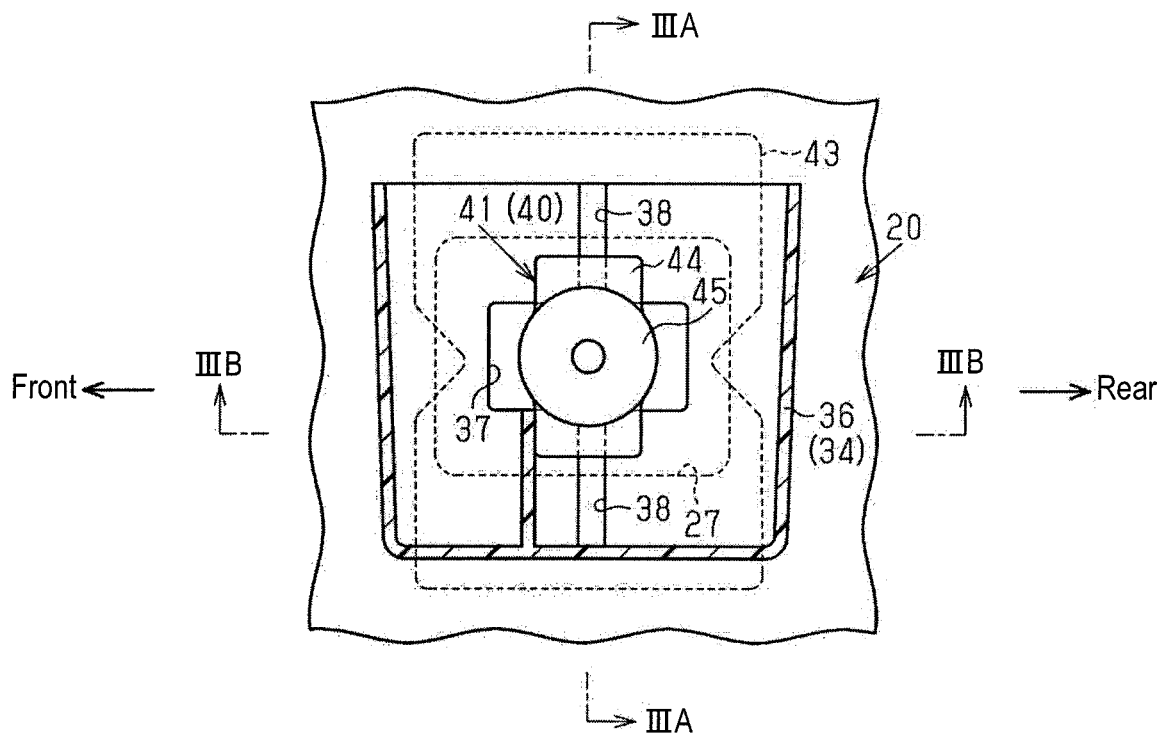
FIG. 2 is a partially-broken plan view illustrating the retention structure of the panel.
Figure 3A:
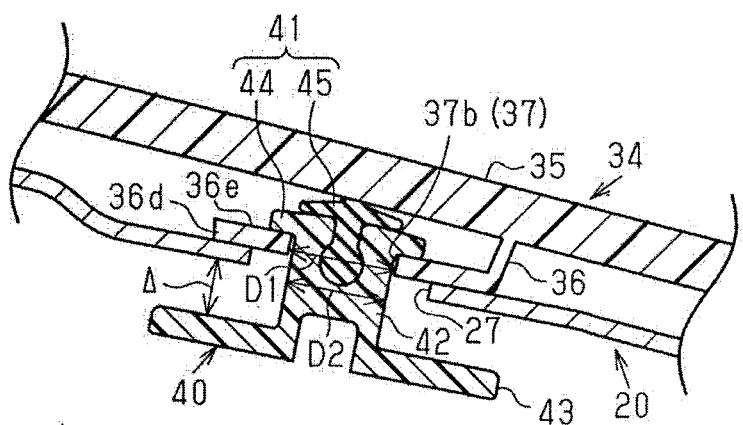
FIG. 3A is a cross sectional view taken along line IIIA-IIIA in FIG. 2.
Figure 3B:
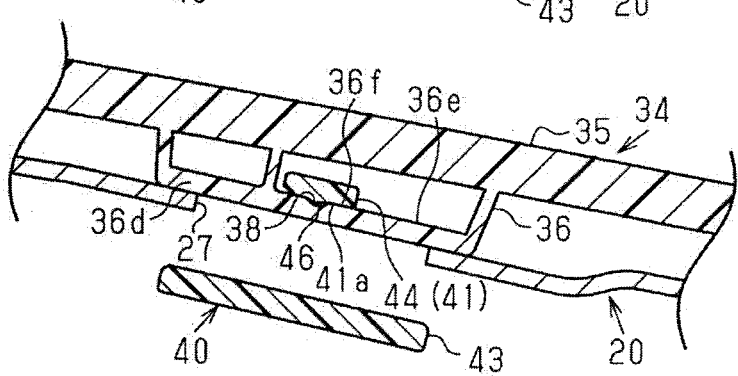
FIG. 3B is a cross sectional view taken along line IIIB-IIIB in FIG. 2.
Figure 4:
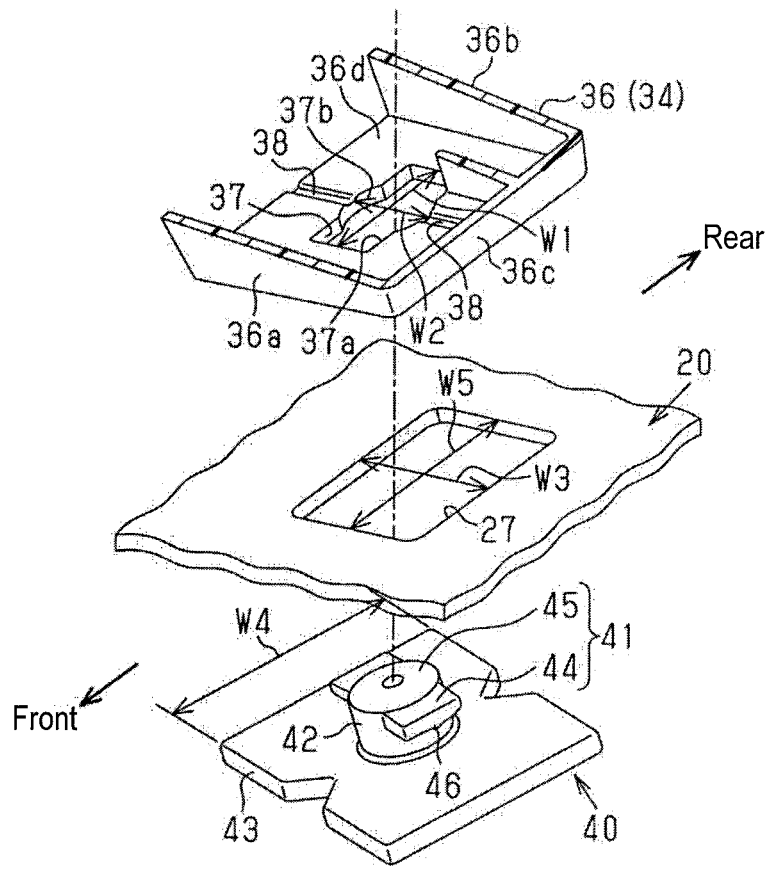
FIG. 4 is a partially-broken exploded perspective view illustrating the retention structure of the panel according to the first embodiment.

Next, the retention member 40 and a circumferential structure being mounted on the rear roof panel 34 will hereunder be explained. As illustrated in FIGS. 2, 3A and 3B, the rear roof panel 34 includes a panel body 35 which is formed in a substantially quadrilateral shape and which forms a design surface. The rear roof panel 34 is joined to the rear frame 23 at the panel body 35. The rear roof panel 34 includes a retention portion 36 that protrudes downwardly relative to the panel body 35 so as to face each of the retention members 40. As illustrated in FIG. 4, the retention portion 36 includes a pair of downwardly extending walls 36a, 36b that is formed in a quadrilateral shape and that is disposed next to each other in the front-rear direction. The retention member 36 further includes a downward extending wall 36c that is formed in a quadrilateral shape and that connects tips of the downward extending walls 36a, 36b in one side in the vehicle width direction (right downward in FIG. 4). The retention member 36 further includes a retention wall 36d that is formed in a quadrilateral shape and that connects the tips of the downward extending walls 36a to 36c. That is, the retention portion 36 is formed in a substantially box shape by cooperating with the panel body 35.

The retention wall 36d extends along the panel body 35 while including a clearance relative thereto in a vehicle height direction. The rear roof panel 34 is supported by the rear frame 23 (the base panel 20) in a state of being in contact therewith at the retention wall 36d.

The retention wall 36d is provided with a first hole 37 opening in the vehicle height direction. The first hole 37 is formed in a substantially two-wing shape in which a rectangular hole 37a extending in the front-rear direction and a circular hole 37b provided at a middle portion of the rectangular hole 37a in the front rear direction are combined with each other. Thus, a center portion (the circular hole 37b) of the first hole 37 opens and extends in the vehicle width direction relative to the end portions in the front-rear directions (the rectangular shape 37a). Then, an opening width W1 of the first hole 37 in the front-rear direction (a first direction serving as one direction) includes an elongated hole shape which is set larger than an opening width W2 in the vehicle width direction (a second direction corresponding to the other direction intersecting the first direction).

The retention wall 36d includes a pair of positioning recessed portions 38 which each is formed in a substantially long-groove shape, which is formed to be recessed downwardly, and which extends in the vehicle width direction while opposing each other from a center in the front-rear direction of the first hole 37 (the circular hole 37b).

Meanwhile, the rear frame 23 (the base panel 20) includes a second hole 27 which is formed in a substantially rectangular shape and which opens in the vehicle height direction while facing the first hole 37. An opening width W3 of the second hole 27 extending along a short side of the rectangular second hole 27 is set larger than the opening width W1 extending along a long side of the rectangular hole 37a. The second hole 27 is disposed so as to contain the whole first hole 37 within the opening thereof when seen in a plan view.

As illustrated in FIGS. 3A and 3B, the retention member 40 includes a head portion 41, a neck portion 42, and a flange portion 43 being provided in the aforementioned order from a distal end thereof. The neck portion 42 includes a dimension which is smaller than the dimension of the first hole 37 and the dimension of the second hole 27, and is provided inside the first and second holes 37, 27. That is, the neck portion 42 is formed in a substantially columnar shape including a diameter D2 that is slightly smaller than an inner diameter D1 of the circular hole 37b (corresponding to the opening width W2). The height of the neck portion 42 is set sufficiently larger than a plate thickness of the retention wall 36d and the rear frame 23 that are combined with each other.

The head portion 41 is connected to an upper end of the neck portion 42 that is provided in the first hole 37, and includes a contact portion 44 that is formed in a substantially two-wing shape that matches the shape of the first hole 37. The contact portion 44 is integrally provided with the neck portion 42 and the flange portion 43 with the use of a resin material (for example, polybutylene terephthalate, or PBT). The contact portion 44 extends in the vehicle width direction (the second direction) and is in contact with a confronting surface 36e serving as a surface of the retention wall 36d facing the panel body 35 at both rim portions of the circular hole 37b in the width direction.

The head portion 41 includes an elastic body 45 which is formed in a substantially conical shape including a diameter similar to, or the same as an inner diameter of the circular hole 37b. An elastic portion 45 is made from a material (for example, an authentic lubber, for example, ethylene-propylene-diene-methylene (EPDM) or a thermoplastic elastomer) including an elasticity higher than the contact portion 44, and part of the elastic portion 45 is connected to an upper end of the contact portion 44 in a state of being provided in the contact portion 44 and being embedded in the neck portion 42. The elastic portion 45 is elastically in contact with the lower surface of the panel body 35 at a sharp tip thereof so as to be in contact with a confronting surface 36e of the retention wall 36d. Accordingly, the position of the retention member 40 in the vehicle height direction relative to, for example, the retention portion 36 (the rear roof panel 34) is decided. Here, the lower end of the neck portion 42 which passes through the second hole 27 is disposed so as to be away from the base panel 20 in the vehicle height direction.

Furthermore, the head portion 41 (the contact portion 44) includes a pair of positioning protrusions 46 formed in a substantially stripe shape protruding downwardly so as to face positioning recessed portions 38. That is, the positioning protrusions 46a each protrudes at a facing surface (a first surface) 41a facing the retention wall 36d of the head portion 41, and the positioning recessed portion 38 is provided at the facing surface (a second surface) 36f of the retention wall 36d facing the head portion 41. The positioning protrusions 46 are fitted into the positioning recessed portions 38 in a state where the head portion 41 (the contact portion 44) extends in the vehicle width direction (the second direction).

Figure 5:
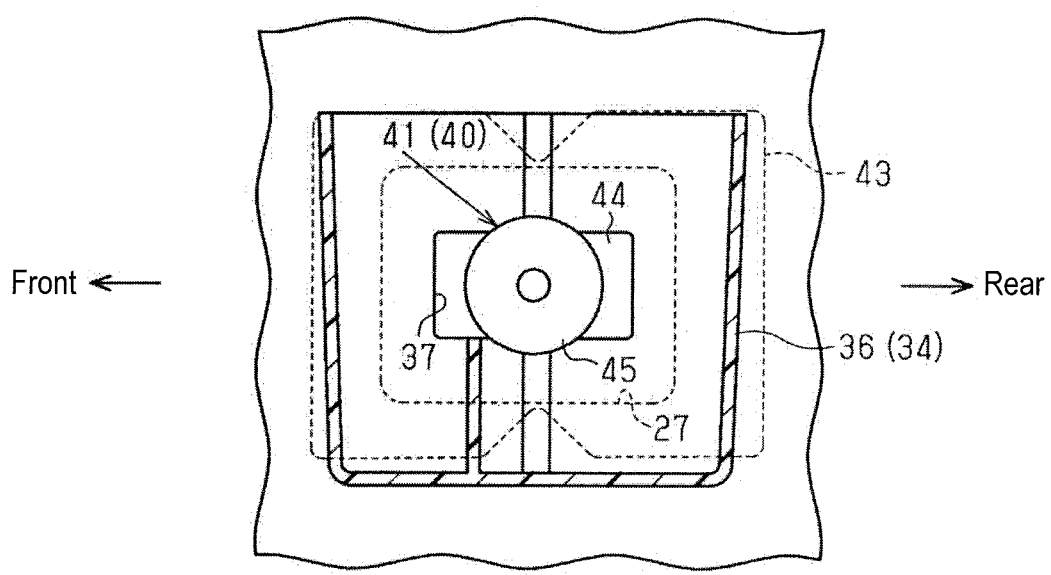
FIG. 5 is a partially-broken plan view illustrating an assembly procedure of the retention structure of the panel according to the first embodiment.

The head portion 41 is formed in a substantially two-wing shape similar to, or the same as a first hole 37 when seen in a plan view. Thus, as shown in FIG. 5, the head portion 41 may be inserted into the first hole 37 in an extending posture in the front rear direction (the first direction).

As illustrated in FIGS. 3A and 3B, the flange portion 43 is connected to a lower end of the neck portion 42 provided in the second hole 27, and is disposed so as to include a clearance Δ relative to the base panel 20 in the vehicle height direction. As illustrated in FIG. 4, the flange portion 43 includes a dimension that is larger than the diameters of the first hole 37 and of the second hole 27, and is wider than the second hole 27. That is, the flange portion 43 is formed in a substantially rectangular shape, and a width W4 that is along a short side of the flange portion 43 is basically set larger than an opening width W5 along a long side of the second hole 27. The flange portion 43 is disposed such that substantially the whole second hole 27 is contained within an outline of the flange portion 43 when seen in a plan view.

The retention member 40 which is attached to the roof panel 31 and peripheral structure are similar to the aforementioned description so that the explanation will not be provided. Next, effects and advantages of the first embodiment will be explained in addition to the action thereof.

(1) In the first embodiment, because the head portion 41 is elastically in contact with the panel body 35 so as to be in contact with the confronting surface 36e of the retention portion 36 in a state where the neck portion 42 is provided in the first hole 37 and the second hole 27, the retention portion 40 is fixed on the rear roof panel 34 (the front roof panel 31). In a state where the rear roof panel 34 (the front roof panel 31) is about to separate from the base panel 20 due to the falling off of glue by the failure in adhesion or the influence of the vibration when the vehicle runs at high speed, the flange portion 43 reaches the base panel 20 to restrict the movement of the rear roof panel 34 (the front roof panel 31). Accordingly, the rear roof panel 34 (the front roof panel 31) may be inhibited from being separated from the base panel 20. Meanwhile, for example, even in a case where the rear roof panel 34 (the front roof panel 31) is thermally deformed in accordance with the temperature change, the retention member 40 moves relative to the base panel 20 within the range of the clearance Δ between the flange portion 43 and the base panel 20 in the vehicle height direction, and inhibits the rear roof panel 34 (the front roof panel 31) from being pulled in. Accordingly, the rear roof panel 34 (the front roof panel 31) inhibits the distortion thereof. Accordingly, the rear roof panel 34 (the front roof panel 31) may secure a smooth appearance.

(2) In the first embodiment, the retention member 40 is elastically in contact with the panel body 35 by the material of the elastic member 45 connected to the contact portion 44 (a material including an elasticity higher than the contact portion 44). The inconvenience of having restriction by the shape of the elastic portion 45 may be solved.

(3) In the first embodiment, the first hole 37 is formed in an elongated hole shape having the opening width W1 in the front rear direction (the first direction) which is set larger than the opening width W2 in the width direction (the second direction). Meanwhile, the head portion 41 extends in the vehicle width direction (the second direction) and may be inserted into the first hole 37 in an extending posture in the front rear direction (the first direction). Accordingly, in a case where the retention member 40 is fixed to the rear roof panel 34 (the front roof panel 31), the head portion 41 is inserted into the first hole 37 in an extending posture in the front-rear direction (the first direction). Then, the retention member 40 has only to be rotated by substantially 90 degrees so that the head portion 41 extends in the vehicle width direction (the second direction), and the head portion 41 comes in contact with the confronting surface 36e at a circumferential rim portion of the first hole 37 (a circular hole 37b). As such, because the retention member 40 may be easily fixed to the rear roof panel 34 (the front roof panel 31), the mountability may be further enhanced.

(4) In the first embodiment, the positioning protrusion 46 protrudes at the facing surface 41a (the first surface) which corresponds to one of the facing surfaces 41a, 36f of the head portion 41 and the retention portion 36, respectively. Meanwhile, the facing surface 36f (the second surface)

which corresponds to the other of the facing surfaces 41*a*, 36*f* of the head portion 41 and the retention portion 36, respectively, includes the positioning recessed portion 38 into which the positioning protrusion 46 is fitted in a state where the head portion 41 extends in the vehicle width direction (the second direction). Accordingly, because the positioning protrusion 46 is fitted into the positioning recessed portion 38 in a state where the head portion 41 extends in the vehicle width direction (the second direction), the retention member 40 may be restricted from rotating relative to the rear roof panel 34 (the front roof panel 31). Thus, the retention member 40 may be restricted from being separated from the rear roof panel 34 (the front roof panel 41) by rotating until a state where the head portion 41 extends in the front-rear direction (the first direction) by receiving the vibration when, for example, the vehicle runs.

(5) In the first embodiment, because the head portion 41 is elastically in contact with the panel body 35 so as to be in contact with the confronting surface 36*e* of the retention portion 36, the retention member 40 may inhibit the backlashing relative to the rear roof panel 34 (the front roof panel 31). Thus, the retention member 40 may be restricted from being separated from the rear roof panel 34 (the front roof panel 31) by rotating until a state where the head portion 41 extends in the front-rear direction (the first direction) by receiving the vibration when, for example, the vehicle runs.

A panel retention structure of a second embodiment will hereunder be explained. The second embodiment includes a retention member that is changed from the retention member of the first embodiment, and the description of the same components as those described in the first embodiment will not be repeated.

Figure 6:
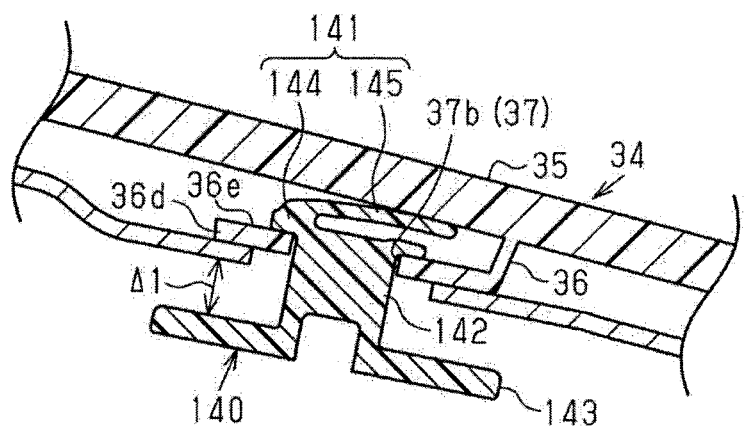
FIG. 6 is a cross sectional view illustrating a retention structure of a panel according to a second embodiment.

As illustrated in FIG. 6, a retention member 140 of the second embodiment is made from a resin material (for example, polybutylene terephthalate, or PBT), and includes a head portion 141, a neck portion 142, and a flange portion 143. The neck portion 142 and the flange portion 143 correspond to the neck portion 42 and the flange portion 43 of the retention member 40 of the first embodiment.

The head portion 141 is connected to an upper end of the neck portion 142 provided in the first hole 37, and includes a contact portion 144 formed in a substantially two-wing shape to match the form of the first hole 37. The contact portion 144 extends in the vehicle width direction (the second direction) and is in contact with the confronting surface 36*e* of the retention wall 36*d* facing the panel body 35 at both rim portions of the circular hole 37*b* in the width direction.

The head portion 141 includes an elastic portion 145 which is formed in a substantially arrow shape so as to protrude upwardly and which is cantilevered at an upper end of the contact portion 144. The elastic portion 145 is elastically in contact with a lower surface of the panel body 35 at a distal end portion so as to be in contact with the confronting surface 36*e* of the retention wall 36*d*. That is, the head portion 141 is elastically in contact with the panel body 35 at the elastic member 145 so as to be in contact with the confronting surface 36*e* of the retention wall 36*d* at the contact portion 144. Accordingly, the retention member 140 is disposed in the vehicle height direction relative to the retention portion 36 (the rear roof panel 34). Here, the flange portion 143 is disposed so as to have a clearance Δ1 in the vehicle height direction relative to the base panel 20.

As described above, according to the second embodiment, the following effects and advantages may be attained in addition to the effects and advantages of the first embodiment described in the aforementioned effects shown in (1) (3) (4) (5).

According to the second embodiment, the elastic contact between the elastic portion 145 and the panel body 35 may be achieved by the formation of the elastic portion 145 that is cantilevered by the contact portion 144. Accordingly, for example, the inconvenience in which the elastic portion is made from an elastic material higher than the contact portion may be solved.

Figure 7:
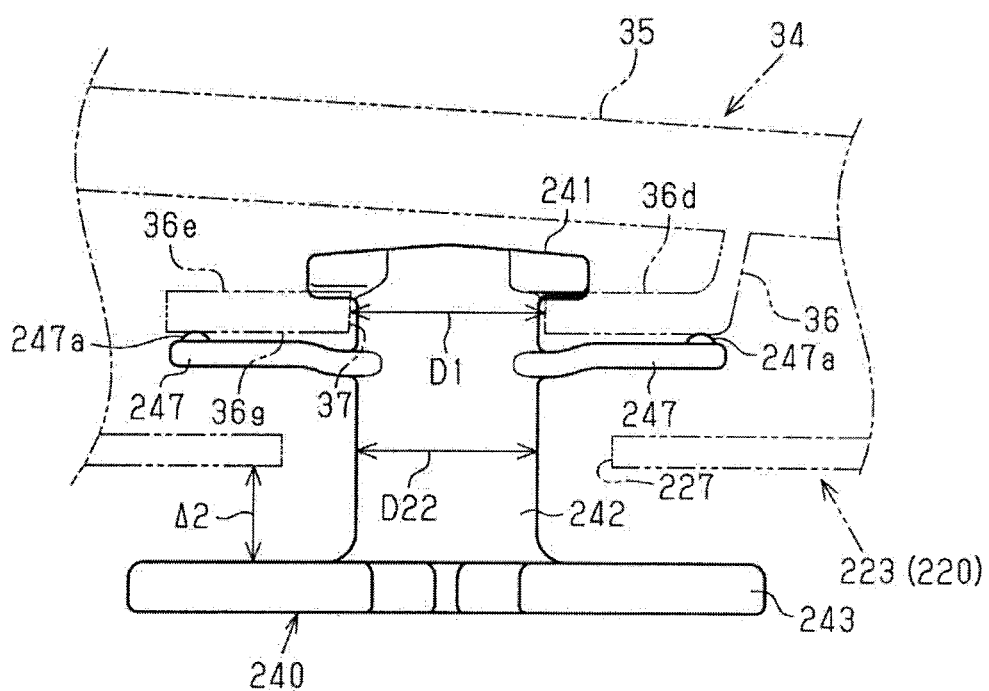
FIG. 7 is a cross sectional view illustrating a retention structure of a panel according to a third embodiment.
Figure 8:
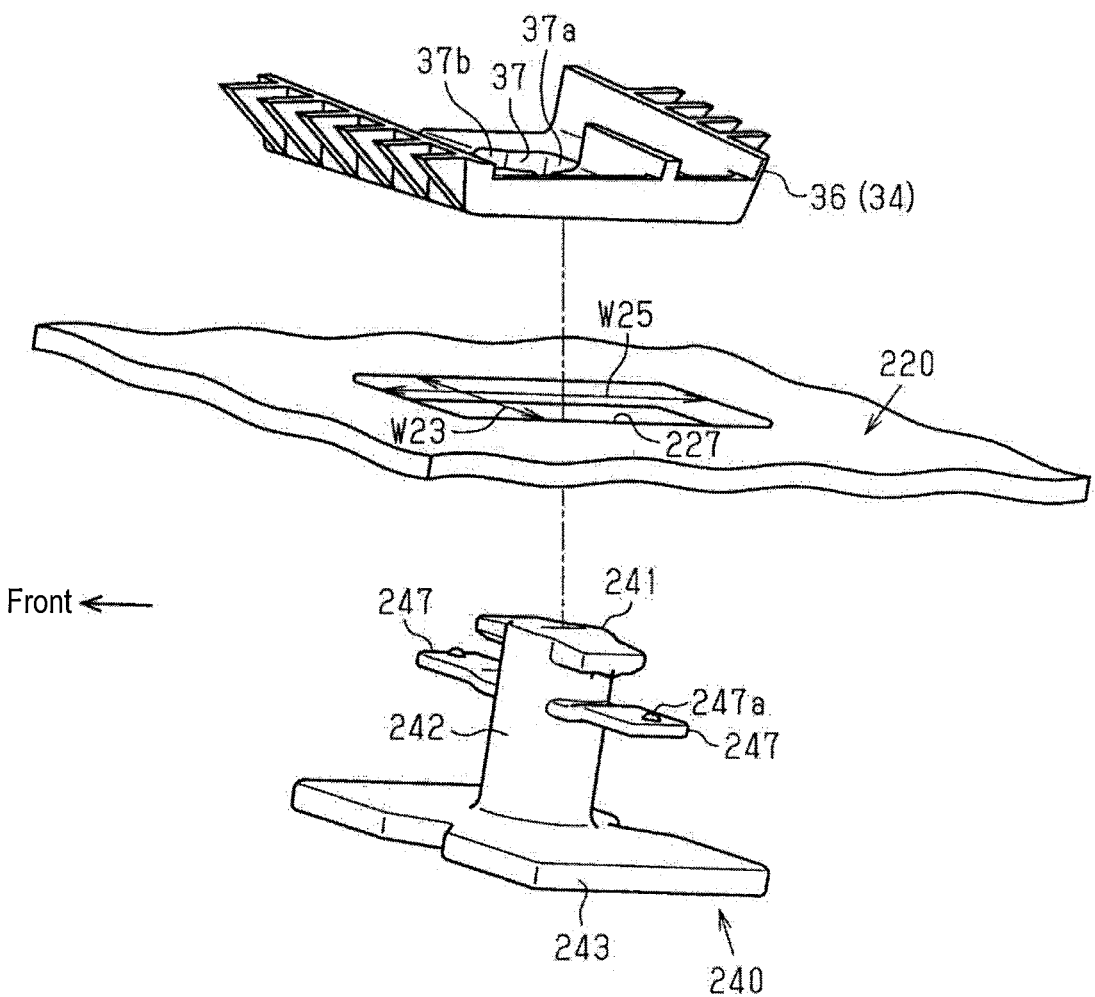
FIG. 8 is a partially-broken exploded perspective view illustrating the retention structure of the panel of the third embodiment.
Figure 9:
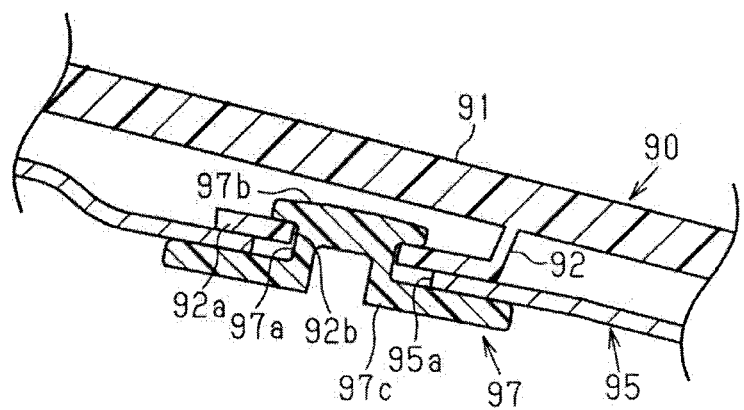
FIG. 9 is a cross sectional view of a conventional mode of a retention structure of a panel.

A panel retention structure of a third embodiment will hereunder be explained. The third embodiment includes a retention member that is changed from the retention member of the first embodiment, and the description of the same components as those described in the first embodiment will not be repeated. As illustrated in FIGS. 7 and 8, a rear frame 223 of a base panel 220 which corresponds to the base panel 20 includes a second hole 227 which is formed in a substantially rectangular shape and which opens in the vehicle height direction by facing the first hole 37. The opening width W23 extended along the short side of the rectangular of a second hole 227 is larger than the opening width W1 (see FIG. 4) extended along the long side of the rectangular hole 37*a*. The second hole 227 is disposed so as to contain the whole first hole 37 therein when seen in a flat view. The retention member 240 of the third embodiment includes a head portion 241, the neck portion 242, and a flange portion 243 being provided in the aforementioned order from a distal end thereof. The head portion 241, the neck portion 242, and the flange portion 243 are integrally made from a resin material (for example, PBT). The flange portion 243 is formed in a shape that corresponds to the shape of the flange portion 43 of the retention member 40 in the first embodiment. The dimension of the neck portion 242 is set smaller than the dimensions of the first hole 37 and the second hole 227, and the neck portion 242 is provided in the first and second holes 37, 227. That is, the neck portion 242 is formed in a substantially columnar shape having a diameter D22 slightly smaller than the inner diameter D1 of the circular hole 37*b* (corresponding to the opening width W2). The height dimension of the neck portion 242 is sufficiently larger than the thickness of the combination of the retention wall 36*d* and the rear frame 223. The head portion 241 is connected to the upper end of the neck portion 242 provided in the first hole 37, and is formed in a substantially two-wing shape to match the shape of the first hole 37. The head portion 241 extends in the vehicle width direction (the second direction), and is in contact with the confronting surface 36*e* of the retention wall 36*d* at the rim portions of the circular hole 37*b* in the vehicle width direction (the second direction). The head portion 241 may be provided in the first hole 37 in an extended posture in the front-rear direction (the first direction). Furthermore, the retention member 240 includes a pair of elastic walls 247 which is formed in a substantially quadrilateral plate shape, the elastic walls 247 which are provided in the vicinity of, and below the head portion 241, which are substantially parallel to the head portion 241, and which protrude in the radial direction both opposing the neck portion 242. The elastic walls 247 are integrally provided with, for example, the neck portion 242. The elastic walls 247 extend in the vehicle width direction (the second direction), and are elastically in contact with opposing surfaces 36*g* corresponding to surfaces of the retention walls 36*d* opposing to the panel body 35 at both rim portions of the circular hole 37*b* in the vehicle width direction. That is, substantially hemi-sphere-shaped protrusions 247*a* each protrudes upwardly towards the opposing surface 36g at each of distal end portions of the elastic walls 247. The elastic walls 247 are elastically in contact with the opposing surfaces 36g at the protrusions 247a so that the head portion 241 is in contact with the confronting surface 36e of the retention wall 36d. Accordingly, the retention member 240 is disposed in the vehicle height direction relative to, for example, the retention portion 36 (the rear roof panel 34). Here, the flange portion 243 is disposed so as to include a clearance Δ2 in the vehicle width direction relative to the base panel 220. As described above, according to the third embodiment, the following effects and advantages may be obtained in addition to the effects and advantages described in the aforementioned effects of the first embodiment shown in (3) to (5).

In the third embodiment, the retention member 240 is fixed at the rear roof panel 34 (the front roof panel 31) such that the elastic wall 247 is elastically in contact with the opposing surface 36g of the retention portion 36 so that the head portion 241 comes in contact with the confronting surface 36e of the retention member 36 in a state where the neck portion 242 is disposed in the first hole 37 and the second hole 227. Then, for example, in a state where the rear roof panel 34 (the front roof panel 31) is about to separate from the base panel 20 due to the falling off of a glue by the failure in adhesion or the influence of the vibration when the vehicle runs at high speed, the flange portion 243 reaches the base panel 220 to restrict the movement of the rear roof panel 34 (the front roof panel 31). Accordingly, the rear roof panel 34 (the front roof panel 31) may be inhibited from being separated from the base panel 220. Meanwhile, for example, even in a case where the rear roof panel 34 (the front roof panel 31) is thermally deformed in accordance with the temperature change, the retention member 240 moves relative to the base panel 220 within the range of the clearance Δ2 between the flange portion 243 and the base panel 220 in the vehicle height direction, and inhibits the rear roof panel 34 (the front roof panel 31) from being pulled in. Accordingly, the rear roof panel 34 (the front roof panel 31) inhibits the distortion thereof. Accordingly, the rear roof panel 34 (the front roof panel 31) may securely include a smooth appearance.

In the third embodiment, by being in contact with the opposing surface 36g of the retention portion 36 at a point by the protrusion 247a of the elastic wall 247, the retention member 240 may be elastically in contact with the opposing surface 36g in a stable state.

The aforementioned first, second and third embodiments may be modified as below.

In the first embodiment, the head portion 41 may be provided such that the contact portion 44 and the elastic portion 45 that are individually formed are integrally mounted with each other. Alternatively, the contact portion 44 and the elastic portion 45 may be integrally formed by, for example, twin-color molding.

In the first and second embodiments, the retention wall 36d does not have to be in contact with the rear frame 23 (the base panel 20).

In the third embodiment, the retention wall 36d may be in contact with the rear frame 223 (the base panel 220).

In the third embodiment, for example, a protrusion which is formed in a substantially stripe shape, and which is in contact with the opposing surface 36g of the retention portion 36 at a line may be adopted instead of the substantially hemi-sphere-shaped protrusion 247a. Alternatively, the protrusion 247a does not have to be provided.

In the third embodiment, the three or more elastic walls 247 may be provided. Alternatively, an elastic wall which is formed in a ring shape and which extends over a whole circumference of the neck portion 242 may be provided.

In the third embodiment, the elastic wall 247 may be made from a material including an elasticity (for example, a synthetic rubber, for example, ethylene propylene diene methylene, or EPDM, or thermoplastic elastomer) higher than the material of, for example, the head portion 241. In this case, the elastic wall 247 and the neck portion 242 may be separately formed, and the elastic wall 247 may be mounted on the neck portion 242. Alternatively, the elastic wall 247 may be integrally formed with the neck portion 242 by, for example, twin-color molding.

In the first, second, and third embodiments, the retention portion 36 and the head portions 41, 141, 241 are provided with the positioning recessed portion 38 and the positioning protrusion 46, respectively. Alternatively, the positional relationship may be opposite. That is, the retention portion 36 and the head portion 41, 141, 241 may be provided with the positioning protrusion 46 and the positioning recessed portion 38, respectively.

In the first, second, and third embodiments, the number and the position of the positioning recessed portions 38 and the positioning protrusions 46 that are provided by a pair may be freely set.

In the first, second, and third embodiments, the positioning recessed portion 38 may be formed in a hole shape. In this case, the positioning protrusion 46 may be formed as a protrusion in order to match the positioning recessed portion 38 so as to be able to insert thereinto.

In the first, second, and third embodiments, the positioning recessed portion 38 and the positioning protrusion 46 may not be provided.

In the first, second, and third embodiments, the extending direction of the first hole 37 may be a direction intersecting the front-rear direction, for example, the vehicle width direction. In this case, the extending direction of the head portion 41, 141, 241 of the retention member 40,140, 240 may correspond to a direction intersecting the extending direction of the first hole 37.

In the first, second, and third embodiments, the first hole 37 may be formed in a long hole shape, for example, a rectangular or an elongated hole shape (for example, an oblong shape), and a rhomboid shape. In this case, the head portion 41, 141, 241 of the retention member 40, 140, 240 may be formed to match the first hole 37 so as be insertable thereinto.

In the first, second, and third embodiments, the first hole 37 may be formed in, for example, a square shape. Even in this case, because the opening width of the first hole 37 which extends along a diagonal line of the square is set larger than the opening width of the first hole 37 that extends along the side of the square, the retention member 40, 140, 240 may be easily fixed to the rear roof panel 34 (the front roof panel 31) in accordance with the first, second and third embodiment by forming the head portion 41, 141, 241 to match the first hole 37.

In the first, second, and third embodiments, the first hole 37 may be formed in a circular shape. In this case, in a process in which the rear roof panel 34 (the front roof panel 31) is attached to the retention member 40, 140, 240, for example, the head portion 41, 141, 241 may pass through the first hole 37 while being elastically deformed.

In the first, second, and third embodiments, the number and the position of the retention member 40, 140, 240 which is attached to the front roof panel 31 may be freely set.

Similarly, the number and the position of the retention member 40, 140, 240 which is attached to the rear roof panel 34 may be freely set.

In the first, second, and third embodiments, the retention member 40, 140, 240 which is attached to one of the front roof panel 31 and the rear roof panel 34 may not be provided.

In the first, second, and third embodiments, in a case where the panel portion 32a of the movable panel 32 is made of resin, the retention member 40, 140, 240 may be attached to the panel portion 32a so as to be adapted to an attaching relationship between the panel portion 32a and the inner panel 32b.

In the first, second, and third embodiments, in a case where the fixed panel 33 is made of resin, the retention member 40, 140, 240 may be attached to the fixed panel 33 so as to be adapted to the attaching relationship between the fixed panel 33 and the base panel 20.

According to the aforementioned first, second and third embodiments, the panel retention structure includes the roof panel 31, 34 being made of resin, the roof panel 31, 34 including the panel body 35 forming a design surface and the retention portion 36 protruding downwardly relative to the panel body 35, the retention portion 36 including the retention wall 36d extending along the panel body 35, the retention wall 36d being formed with the first hole 37 opening in the vehicle height direction, the base panel 20, 220 being made of metal, the base panel 20, 220 being joined to the roof panel 31, 34 with an adhesive agent, the base panel 31, 34 being formed with the second hole 27, 227 opening in the vehicle height direction and facing the first hole 37, the base panel 20 supporting the roof panel 31, 34, and the retention member 40, 140, 240 including the head portion 41, 141, 241, the neck portion 42, 142 and the flange portion 43, 143, 243 being provided in the aforementioned order from the end of the retention member 40, 140, 240. The neck portion 42, 142 includes a dimension which is set smaller than the dimension of the first hole 37 and the dimension of the second hole 27, 227, and passes through the first hole 37 and the second hole 27, 227, the head portion 41, 141, 241 is in contact with a confronting surface 36e serving as the surface of the retention wall 36d facing the panel body 35 in one of a state where the head portion 41, 141, 241 is elastically in contact with the panel body 35, and a state where the elastic wall 247 being elastically in contact with the opposing surface 36g serving as a surface of the retention wall 36d which opposes the panel body 35 is provided, and the flange portion 43, 143, 243 includes a dimension which is set larger than the dimension of the first hole 37 and the dimension of the second hole 27, 227, the flange portion 43, 143, 243 being disposed to include the clearance Δ, Δ1, Δ2 relative to the base panel 20 in the vehicle height direction.

According to the aforementioned configuration, the retention member 40, 140, 240 is fixed to the roof panel 31, 34 such that the head portion 41, 141, 241 is elastically in contact with the panel body 35 so as to be in contact with the confronting surface 36e of the retention wall 36d in a state where the neck portion 42, 142 passes through the first hole 37 and the second hole 27, 227. Alternatively, the retention member 240 is fixed to the roof panel 31, 34 by the elastic wall 247 is elastically in contact with the opposing surface 36g of the retention wall 36d such that the head portion 241 is in contact with the confronting surface 36e of the retention wall 36d in a state where the neck portion 242 passes through the first hole 37 and the second hole 227. Then, for example, in a state where the roof panel 31, 34 is about to separate from the base panel 20 due to the falling off of a glue by the failure in adhesion or the influence of the vibration when the vehicle runs at high speed, the flange portion 43, 143, 243 reaches the base panel 20, 220 to restrict the movement of the roof panel 31, 34. Accordingly, the roof panel 31, 34 may be inhibited from being separated from the base panel 20, 220. Meanwhile, for example, even in a case where the roof panel 31, 34 is thermally deformed in accordance with the temperature change, the retention member 40, 140, 240 moves relative to the base panel 20, 220 within the range of the clearance Δ, Δ1, Δ2 between the flange portion 43, 143, 243 and the base panel 20, 220 in the vehicle height direction, and inhibits the roof panel 31, 34 from being pulled in. Accordingly, the roof panel 31, 34 inhibits the distortion thereof. Accordingly, the roof panel 31, 34 may securely include a smooth appearance.

According to the aforementioned second embodiment, the head portion 141 includes the contact portion 144 being in contact with the confronting surface 36e of the retention wall 36d, and the elastic portion 145 being elastically in contact with the panel body 31, 34 while being cantilevered by the contact portion 144.

According to the aforementioned configuration, the elastic contact between the elastic portion 145 and the panel body 35 may be achieved by the formation of the elastic portion 145 that is cantilevered by the contact portion 144.

According to the aforementioned first embodiment, the head portion 41 includes the contact portion 44 being in contact with the confronting surface 36e of the retention wall 36d, and the elastic portion 45 being made from the material including elasticity higher than the contact portion 44, the elastic portion 45 being elastically in contact with the panel body 34 while being connected to the contact portion 44.

According to the aforementioned configuration, the elastic contact between the elastic portion 45 and the panel body 35 may be achieved by the material of the elastic portion 45 being connected to the contact portion 44.

According to the first, second and third embodiments, the first hole 37 includes the elongated hole shape in which the opening width W1 in the first direction serving as one direction is set larger than the opening width W2 in the second direction serving as the other direction that intersects the first direction. The head portion 41, 141, 241 extends in the second direction and is allowed to insert into the first hole in an extending posture in the first direction.

According to the aforementioned configuration, in a case where the retention member 40 is fixed to the roof panel 31, 34, the head portion 41, 141, 241 is inserted into the first hole 37 in an extending posture in the first direction. Then, the retention member 40 has only to be rotated so that the head portion 41, 141, 241 extends in the second direction, and the head portion 41, 141, 241 comes in contact with the confronting surface 36e at the circumferential rim portion of the first hole 37. As such, because the retention member 40, 140, 240 may be easily fixed to the roof panel 31, 34, the mountability may be further enhanced.

According to the first, second and third embodiments, the head portion 41, 141, 241 and the retention wall 36d include facing surfaces 36f, 41a facing each other respectively, the facing surfaces 36f, 41a serving as the first surface 41a and the second surface 36f. The first surface 41a includes the positioning protrusion 46 being protrudingly provided, and the second surface 36f includes the positioning recessed portion 38 into which the positioning protrusion 46 is fitted in a state where the head portion 41, 141, 241 extends in the second direction.

According to the aforementioned configuration, because the positioning protrusion 46 is fitted into the positioning recessed portion 38 in a state where the head portion 41 extends in the second direction, the retention member 40 may be restricted from rotating relative to the roof panel 31, 34. Thus, the retention member 40 may be restricted from being separated from the roof panel 31, 34 by rotating until a state where the head portion 41, 141, 241 extends in the first direction by receiving the vibration when, for example, the vehicle runs.

According to the disclosure, the roof panel 31, 34 may be inhibited from being deformed in accordance with the temperature change while inhibiting the roof panel 31, 34 from falling off of the base panel 20, 220.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A panel retention structure, comprising:
   a roof panel being made of resin, the roof panel including a panel body forming a design surface and a retention portion protruding downwardly relative to the panel body, the retention portion including a retention wall extending along the panel body, the retention wall being formed with a first hole opening in a vehicle height direction;
   a base panel being made of metal, the base panel being joined to the roof panel with an adhesive agent, the base panel being formed with a second hole opening in the vehicle height direction and facing the first hole, the base panel supporting the roof panel; and
   a retention member including a head portion, a neck portion and a flange portion being provided in the aforementioned order from an end of the retention member; wherein
   the neck portion includes a dimension which is set smaller than a dimension of the first hole and a dimension of the second hole, and passes through the first hole and the second hole,
   the head portion is in contact with a confronting surface serving as the surface of the retention wall facing the panel body in one of a state where the head portion is elastically in contact with the panel body, and a state where an elastic wall being elastically in contact with an opposing surface serving as a surface of the retention wall which opposes the panel body is provided, and
   the flange portion includes a dimension which is set larger than the dimension of the first hole and the dimension of the second hole, the flange portion being disposed to include a clearance relative to the base panel in the vehicle height direction.

2. The panel retention structure according to claim 1, wherein the head portion includes
   a contact portion being in contact with the confronting surface of the retention wall, and
   an elastic portion being elastically in contact with the panel body while being cantilevered by the contact portion.

3. The panel retention structure according to claim 1, wherein the head portion includes
   a contact portion being in contact with the confronting surface of the retention wall, and
   an elastic portion being made from a material including elasticity higher than the contact portion, the elastic portion being elastically in contact with the panel body while being connected to the contact portion.

4. The panel retention structure according to claim 1, wherein
   the first hole includes an elongated hole shape in which an opening width in a first direction serving as one direction is set larger than an opening width in a second direction serving as the other direction that intersects the first direction, and
   the head portion extends in the second direction and is allowed to insert into the first hole in an extending posture in the first direction.

5. The panel retention structure according to claim 4, wherein
   the head portion and the retention wall include facing surfaces facing each other respectively, the facing surfaces serving as a first surface and a second surface, the first surface serving as one of the facing surface of the head portion and the facing surface of the retention wall, the second surface serving as the other of the facing surface of the head portion and the facing surface of the retention wall,
   the first surface includes a positioning protrusion being protrudingly provided; and
   the second surface includes a positioning recessed portion into which the positioning protrusion is fitted in a state where the head portion extends in the second direction.

* * * * *